(12) United States Patent
Kato et al.

(10) Patent No.: US 7,884,547 B2
(45) Date of Patent: Feb. 8, 2011

(54) LEAD-FREE ACID-RESISTANT GLASS COMPOSITION AND GLASS PASTE COMPRISED OF THE SAME

(75) Inventors: Yuko Kato, Nagoya (JP); Makiko Imai, Nagoya (JP)

(73) Assignee: Noritake Co., Limited, Nagoya-shi (JP)

( * ) Notice: Subject to any disclaimer, the term of this patent is extended or adjusted under 35 U.S.C. 154(b) by 176 days.

(21) Appl. No.: 12/068,076

(22) Filed: Feb. 1, 2008

(65) Prior Publication Data
US 2008/0185962 A1    Aug. 7, 2008

(30) Foreign Application Priority Data
Feb. 6, 2007    (JP) ................ 2007-027267

(51) Int. Cl.
*H01J 17/49*    (2006.01)
(52) U.S. Cl. .............. 313/582; 501/26; 501/78
(58) Field of Classification Search ........ None
See application file for complete search history.

(56) References Cited

U.S. PATENT DOCUMENTS

| | | |
|---|---|---|
| 6,197,480 B1 | 3/2001 | Iguchi et al. |
| 7,341,964 B2 * | 3/2008 | Emlemdi .................. 501/26 |
| 2003/0228471 A1 * | 12/2003 | Hayakawa et al. .......... 428/426 |
| 2006/0025298 A1 * | 2/2006 | Emlemdi .................. 501/26 |
| 2007/0009744 A1 * | 1/2007 | Besinger et al. ........... 428/426 |

FOREIGN PATENT DOCUMENTS

| | | |
|---|---|---|
| JP | A 9-310030 | 12/1997 |
| JP | A 10-120432 | 5/1998 |
| JP | B1 2990194 | 10/1999 |
| JP | A 11-314937 | 11/1999 |
| JP | A 2000-16834 | 1/2000 |
| JP | A 2000-302480 | 10/2000 |
| JP | A 2002-179435 | 6/2002 |
| JP | A 2003-257242 | 9/2003 |
| JP | A 2005-15280 | 1/2005 |
| JP | A 2006-509341 | 3/2006 |
| JP | A-2008-030994 | 2/2008 |

OTHER PUBLICATIONS

Japanese Office Action mailed Jan. 26, 2010 for Japanese Patent Application No. 2007-027267 (with translation).

* cited by examiner

*Primary Examiner*—Ashok Patel
(74) *Attorney, Agent, or Firm*—Oliff & Berridge, PLC

(57) ABSTRACT

Lead-free acid-resistant glass composition includes 5-25% of $SiO_2$, 4-30% of $B_2O_3$, 7-30% of ZnO, 15-70% of $Bi_2O_3$, 0-15% of $Al_2O_3$, 5-20% of BaO in weight percentage, and being substantially lead-free.

6 Claims, 4 Drawing Sheets

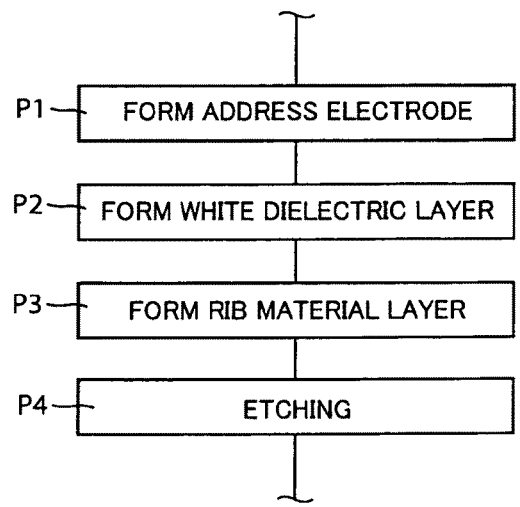
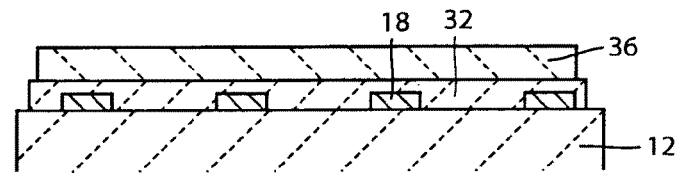
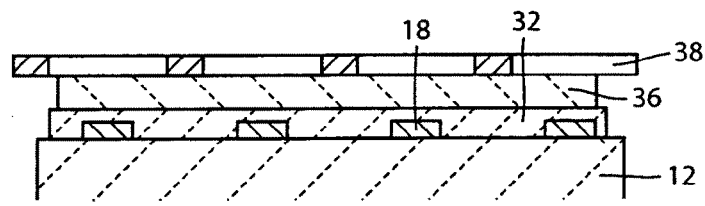
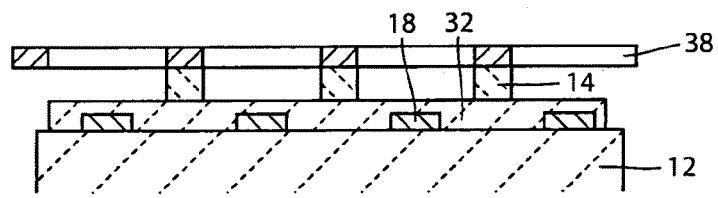
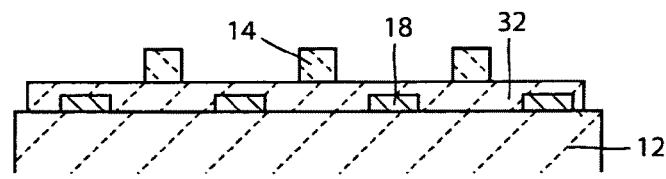

LEAD-FREE ACID-RESISTANT GLASS COMPOSITION AND GLASS PASTE COMPRISED OF THE SAME

This application is based on Japanese Patent Application No. 2007-027267 filed Feb. 6, 2007, the contents of which are incorporated hereinto by reference.

BACKGROUND OF THE INVENTION

1. Field of the Invention

The present invention relates to lead-free acid-resistant glass composition, and glass paste comprised of the same.

2. Description of Related Art

In manufacturing plasma display panels (PDP), a white dielectric layer, or a white back (W/B), is formed on a surface of a glass substrate that functions as a back plate disposed at the opposite side of a watcher of television. And rib walls, or partition walls, are projected therefrom to form a plurality of discharge spaces. Although the rib substrate provided with the white dielectric layer and rib walls are conventionally manufactured in a sandblast method or a thick film screen printing method, recent rib substrates are manufactured in a chemical etching method, or a wet etching method, because it is easy to form them with a superiority in precision in their sizes and shapes, for instance, as disclosed in JP 2006-509341 A.

In the chemical etching method, for instance, a rib material layer having an even thickness to form rib walls is formed on a surface of the white dielectric layer as covering the whole surface by such as taping or paste applying; the rib material layer is burnt; then the rib material layer is capped with a planar resist layer 50 to form a predetermined pattern as shown in FIG. 1; the rib material layer is etched by acid such as nitric acid. This dissolves and removes portions 54 of the rib material layer 52 indicated by slants in FIG. 1 as illustrating the predetermined pattern of the resist layer 50, to obtain the rib walls having high precision in sizes and shapes in line with the precise pattern of the resist layer 50. FIG. 1 illustrates the white dielectric layer 56, the back plate 58 and address electrodes 60.

In the above manufacture of the rib substrate using the chemical etching method, almost perfect removal of the portions of the rib material layer 52 under opens of the resist layer 50 approximately without dissolution of the white dielectric layer 56 is required to protect the electrodes under the white dielectric layer 56 ensuring the rib walls with an even height. Accordingly, the rib material layer 52 is required to be appropriately dissolved in an acid used such as nitric acid, and at the same time the white dielectric layer 56 is required to be acid-resistant. The remarkable difference in speeds between the etchings for the rib material layer 52 and the white dielectric layer 56 is preferable.

On the other hand, the smallest possible difference in material characteristics such as the thermal expansion coefficient or dielectric constant is preferable because the white dielectric layer 56 and the rib walls fixed thereon are to be exposed to plasma in the same space, for instance, in the same discharge space of the PDP. It is difficult to satisfy these requirements at the same time because the remarkable difference in acid resistance for glass materials accompanies with the remarkable difference in the material characteristics such as the thermal expansion coefficient or dielectric constant. The difference in acid resistance is required to be within the range where minimal etching is possible, for the smallest possible difference in material characteristics, in the manufacture of the rib substrate using the chemical etching method. As a result, it is difficult to satisfy the requirements in both characteristics and precision. Lead-free glass that is expected to be a substitute for lead glass against recent environmental pollution by lead glass is difficult to be the material for precise etching because it is inferior in acid resistance to lead glass. And glass for the white dielectric layer 56 is required to have a softening point of not more than about 650° C., preferably not more than about 600° C., and a thermal expansion coefficient near to that of the back plate 58, so that the glass can be formed on the back plate 58, or a substrate, made from such as soda lime glass. These requirements limit one in choosing appropriate materials.

Various lead-free glass compositions against environmental pollution are suggested for various uses from before. JP 2006-509341 A principally relating to partition formation by chemical etching using lead glass, for instance, discloses possible lead-free glass composition for the white dielectric layer. It also discloses an example of lead-free glass for the rib walls comprising (in weight percent; hereinafter, "%" means "weight percent" if there is not another definition) 19% of ZnO, 6% of $SiO_2$, 37% of $B_2O_3$ and 38% of $Li_2O+Na_2O+K_2O$, and another example comprising 22% of ZnO, 21% of $SiO_2$, 30% of $B_2O_3$, 5% of $Al_2O_3+ZrO_2$, 21% of $Li_2O+Na_2O+K_2O$ and 1% of BaO.

JP 2990194 B discloses a high acid-resistant lead-free glass composition for a glaze to reform the surface of a cement product, comprising in molar fraction 35-60% of $SiO_2$, 16-26% of $B_2O_3$, 6-8% of $Li_2O$, 4-17% of $R_2O$ and 5-15% of RO (where, $R_2O$ is selected from $Na_2O$ and $K_2O$, and RO is at least one selected from a group of MgO, CaO, ZnO, BaO and SrO). JP 2002-179435 A discloses a high acid-resistant lead-free glass composition for formation of a color layer printed on a planar glass for an automobile, comprising 32-55% of $SiO_2$, 4-25% of $B_2O_3$, 1-30% of ZnO, 1-15% of $Al_2O_3$, 7-20% of $Li_2O+Na_2O+K_2O$, 1-15% of $TiO_2+ZrO_2+SnO_2+CeO_2$, 0-5% of $P_2O_5$, 0-5% of CuO, 0-5% of $La_2O_3$ and 0-3% of F+Cl. JP 2000-302480 A discloses a lead-free glass composition also for an automobile, comprising 10-36% of $SiO_2$, 56-75% of $Bi_2O_3$, 3-7% of $TiO_2$, 3-5% of $Li_2O$, 0-2% of $Na_2O$ and 0-3% of $K_2O$.

JP 2005-015280 A discloses $B_2O_3$—ZnO—BaO series lead-free glass with a low softening point having 0.1-10% (oxide equivalent) of Sn for transparent dielectric at the front side. JP 2000-016834 A discloses low softening point glass comprising 60% of $Bi_2O_3$, 30% of $B_2O_3$ and 10% of $SiO_2$ for the white dielectric layer where the rib walls are formed by sandblasting. JP 2003-257242 A discloses lead-free glass for thick layer resistance paste for circuit substrate, comprising not more than 1% of alkali metal, 10-30% of $Bi_2O_3$, 25-40% of $SiO_2$, 30-40% of BaO, 5-7% of ZnO, 4-7% of $Al_2O_3$ and 0.01-8% of $B_2O_3$.

However, JP 2006-509341 A does not disclose any preferable lead-free glass to the white dielectric layer, only discloses lead-free glass for the rib walls to be removed by chemical etching, and it includes a large amount of alkali oxide and $Bi_2O_3$ and is low acid-resistant and low water-resistant. The glass compositions in JP 2990194 B, JP 2002-179435 A and JP 2000-302480 A are utterly different from the white dielectric layer of the PDP in use as mentioned above, and the compositions are not appropriate for the white dielectric layer of the PDP because the burning temperature of the composition in JP 2990194 B is high and 700-850° C., and those concretely disclosed in JP 2002-179435 A and JP 2000-302480 A are comparatively high and not less than 650° C. JP 2005-015280 A discloses glass composition for forming a transparent dielectric layer without etching, and no mention on such as formation of rib walls by chemical etching or acid resistance of dielectric is provided. The glass composition in JP 2000-016834 A is used for the sandblast method, and is not appropriate for the white dielectric layer on which rib walls are formed by chemical etching. Furthermore, that composition is not appropriate in stability because it has remarkably little $SiO_2$ that is the component of glass. The glass composition in JP 2003-257242 A is different from the white dielectric layer in use as mentioned above, and the burning temperature is high and not less than 700° C.

An example of high acid-resistant lead-free glass is borosilicate glass, for instance, PYREX® of Corning Incorporated, but it is not appropriate for the PDP because its softening point is high and about 820° C. Addition of alkali metal causes lowering of the softening point of borosilicate glass, but it also causes rising of the thermal expansion coefficient and lowering in acid resistance. Use of boric acid or phosphoric acid as the glass skeleton component is suggested to obtain glass having a low softening point, but these are remarkably low chemical resistant, and accordingly, it is not appropriate for the white dielectric layer for forming rib walls by chemical etching.

JP 2000-302480 A, JP 2000-016834 A and JP 2003-257242 A disclose $Bi_2O_3$ series glass including bismuth (Bi), a usual substitute for lead (Pb), being available and utilized in many fields. Since addition of $Bi_2O_3$ causes rising of the dielectric constant, regulation of the dielectric constant by addition of other material(s) is often required for electronics such as PDPs.

The white dielectric layer to have rib walls thereon formed by chemical etching is required to (1) be lead-free, (2) be acid-resistant, (3) have a low softening point, (4) have a thermal expansion coefficient near to that of a glass substrate and (5) have a low dielectric constant since the white dielectric layer covering address electrodes functions as their dielectric. $Bi_2O_3$ series glass preferably meets these requirements. However, it was found that cavities or cavity layers may be formed at an interface of the substrate 58 and the white dielectric layer 56 near an address electrode 60 made of such as thick layer silver, as shown in FIG. 1, upon formation of the white dielectric layer with $Bi_2O_3$ series glass significantly different in acid resistance from glass forming rib walls, for forming the rib walls by chemical etching. These cavities 62 cause disadvantages by raising the dielectric constant in the adjacency of the address electrode 60, lowering the discharge characteristics and, accordingly, causing unlighting in places.

It is therefore an object of the present invention to provide lead-free glass composition preferable for a white dielectric layer, being high acid-resistant, and having a low softening point, a thermal expansion coefficient almost equal to that of a glass substrate for the PDP and a low dielectric constant, and avoiding to have cavities formed, and glass paste comprised of the same.

SUMMARY OF THE INVENTION

The object indicated above may be achieved according to a first aspect of the invention, which provides lead-free acid-resistant glass composition comprising 5-25% of $SiO_2$, 4-30% of $B_2O_3$, 7-30% of ZnO, 15-70% of $Bi_2O_3$, 0-15% of $Al_2O_3$, 5-20% of BaO in weight percentage, and being substantially lead-free.

The object indicated above may be achieved according to a second aspect of the invention, which provides glass paste comprising the composition according to the first aspect of the invention, inorganic filler, vehicle, and having a dielectric constant after burnt of not more than 20.

According to the first aspect of the invention, since each component is included in $SiO_2$—$B_2O_3$—ZnO—$Bi_2O_3$—$Al_2O_3$ series glass at the rate described above and BaO is also included in the range of 5-20%, lead-free glass composition being high acid-resistant, having a low softening point, a thermal expansion coefficient almost equal to that of a glass substrate for the PDP and a low dielectric constant, and avoiding to have cavities formed, can be provided.

According to the second aspect of the invention, since inorganic filler and vehicle are added into the glass composition and the dielectric constant after burnt is regulated so as not to exceed 20, the glass paste can be preferably used for the white dielectric layer of the PDP. A higher dielectric constant is obtained if the paste prepared by adding inorganic filler into the glass composition according to the first aspect of the present invention to form the glass layer, than that of the glass layer formed with the glass composition and without any inorganic filler. It is preferable to determine kinds and quantity of the inorganic filler such that the dielectric constant of the glass layer does not exceed 20. The value of not more than 20 is preferable because the dielectric constant of the white dielectric layer of the PDP influences the power consumption and the low dielectric constant causes low power consumption.

The followings are the reasons for requirement of each component and for requirement of each content described above.

BaO is requisite for increasing the stability of glass and avoiding cavities formed at the interface between the glass substrate and the white dielectric layer. It cannot sufficiently restrain forming of the cavities if below 5% of BaO is added. The thermal expansion coefficient becomes too large if over 20% of BaO is added. Addition of not less than 7% of BaO is further preferable. Cavities may be formed in the range of 5-7% of BaO by an influence derived from the content of another component. Addition of 7-18% of BaO is more further preferable.

$SiO_2$ is an oxide for forming glass (that is, component for forming the skeleton of glass) and requisite for increasing chemical resistance of glass. Below 5% of $SiO_2$ causes insufficiency in stability and acid resistance, and over 25% of $SiO_2$ causes the high softening point. Addition of 6-17% of $SiO_2$ is further preferable.

$B_2O_3$ is also an oxide for forming glass and requisite for lowering the softening point of glass. Below 4% of $B_2O_3$ causes the high softening point, and over 30% of $B_2O_3$ causes insufficiency in chemical resistance. Addition of 7-25% of $B_2O_3$ is further preferable.

ZnO causes the low softening point and small thermal expansion coefficient. Below 7% of ZnO causes the high softening point and too large thermal expansion coefficient, and over 30% of ZnO causes also the high softening point and insufficiency in acid resistance. Addition of 8-20% of ZnO is further preferable.

$Al_2O_3$ causes improvement in acid resistance of glass, and over 15% of $Al_2O_3$ causes the high softening point. Addition of 0-10% of $Al_2O_3$ is further preferable.

$Bi_2O_3$ is requisite for the low softening point of glass and improvement in acid resistance of glass. Below 15% of $Bi_2O_3$ causes the too high softening point, and over 70% of $Bi_2O_3$ causes the too high dielectric constant of glass. Addition of 20-65% of $Bi_2O_3$ is further preferable.

The glass made from the glass composition and glass paste according to the present invention having the composition describe above has a thermal expansion coefficient of about 6.5–10.0×10$^{-6}$/° C. in the range of the room temperature to 300° C. Consequently, approximate equality of the thermal expansion coefficients between the above glass and the substrate material made from such as soda lime glass provides an advantage that deformation derived from the difference in the thermal expansion coefficient upon forming of the white dielectric layer on the substrate is hard to be generated.

The glass made from the glass composition and glass paste according to the present invention having the composition describe above has a burning temperature of 600° C. Consequently, the glass is preferably available for forming layers on the rib substrate of the PDP made from soda lime glass.

The glass composition according to the present invention may include another component or other components such as $TiO_2$ and/or $ZrO_2$ for improvement in acid resistance of the glass other than the above components. Addition of these components should be preferably below 10% in total because addition of over 10% in total causes the too high softening point.

The glass composition according to the present invention may include various components such as $P_2O_5$, CuO, $MoO_3$, $SnO_2$ and/or alkali metal oxides such as $Li_2O$, $Na_2O$ and/or $K_2O$, for instance, in order to lower the softening point. Addition of alkali metal oxide should be preferably below 15% in total to restrain lowering of acid resistance.

The glass composition according to the present invention may include other alkali earth metal oxides such as CaO and/or SrO in addition to BaO for improvement in stability of glass.

The glass composition according to the present invention may include further other various components barring deficiency in each characteristic mentioned above. In addition to each component mentioned above and other components in forms of oxide, those in other various forms of compound, such as carbonate or nitrate or in a form of element may be mixed upon manufacturing of glass composition.

The glass composition according to the present invention is characteristic of high acid resistance, and preferably used for the white dielectric layer of the PDP on which the rib wall is formed by chemical etching. It is also preferably used for an insulating layer of a vacuum fluorescent display (VFD) and a transparent dielectric layer on the front side of the PDP, and also for other insulating layers and dielectric layers of substrates for various electronic components. Furthermore, it is also used for acid-resistant coating upon plating on metals or ceramic.

The followings are the steps for sequentially manufacturing the rib substrate provided with the rib wall having the predetermined planar shape on the white dielectric layer using the glass composition according to the present invention: (a) Dielectric layer forming step to form the white dielectric layer by applying a first glass paste (for instance, the glass paste according to the second aspect of the present invention) in which the glass composition according to the first aspect of the present invention is dispersed in a predetermined vehicle, to a predetermined substrate, and treated in a burning treatment; (b) Rib material layer forming step to form a rib material layer having an even thickness by applying a second glass paste in which the lead-free glass composition is dispersed in a predetermined vehicle, the lead-free glass composition being lower in acid resistance than the glass composition according to the present invention, to the white dielectric layer as covering the whole upper surface of the white dielectric layer, and treated in a burning treatment; (c) Etching step to form the rib wall from the rib material layer by etching with acid.

This provides preferable removal of the predetermined portions of the rib material layer in accordance with the mask pattern for forming the rib wall almost without dissolving the white dielectric layer because etching the rib material layer progresses faster than etching the white dielectric layer derived from the difference in acid resistance between them (that is, the white dielectric layer is superior in acid resistance to the rib material layer) in the etching treatment of the rib material layer by acid in the etching step. Chemical etching can provide the superior rib substrate in characteristics and precision because the glass composition according to the present invention with the above-mentioned composition and the conventional glass composition for the rib material or the glass composition with replacement in its part(s) based on the conventional glass composition has approximately equal values of such as the thermal expansion coefficient and dielectric constant to each other.

Many appropriate ways for the dielectric layer forming step and the rib material layer forming step may be adopted provided that they can form glass layer having an even thickness on the substrate. For example, it is preferable to form the paste layer in the thick film screen printing or by bar coater application, and to be treated in drying and burning treatments. It is preferable that the glass made from the glass composition according to the present invention may have about one third (⅓) of the glass made from the glass composition for the rib wall in the solution velocity ratio with respect to acid. This provides the further superior rib wall in precision of sizes and shapes because the solution velocity ratio relatively becomes sufficiently low. Further preferably, the glass for the white dielectric layer may have about not more than one fifth (⅕) of the glass for the rib material layer by selecting materials.

BRIEF DESCRIPTION OF THE DRAWINGS

FIG. 3 illustrates the essential steps in manufacturing of the rib substrate in FIG. 2.

FIGS. 4A-4D illustrate layers for each step in manufacturing. FIG. 4A illustrates layers with the rib material layer. FIG. 4B illustrates the layers with the resist pattern. FIG. 4C illustrates the layers after the chemical etching treatment. FIG. 4D illustrates the layers with the resist pattern removed.

DETAILED DESCRIPTION OF EXEMPLARY EMBODIMENTS

Hereinafter, there will be described the present invention by reference to the drawings. The figures are appropriately simplified or transformed, and all the proportion of the dimension and the shape of a portion or member may not be reflective of the real one in the following embodiments.

Figure 1:
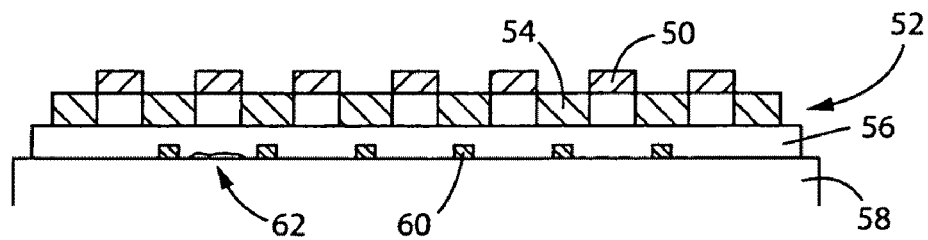
FIG. 1 illustrates a rib substrate in a sectional view on rib forming by chemical etching.
Figure 2:
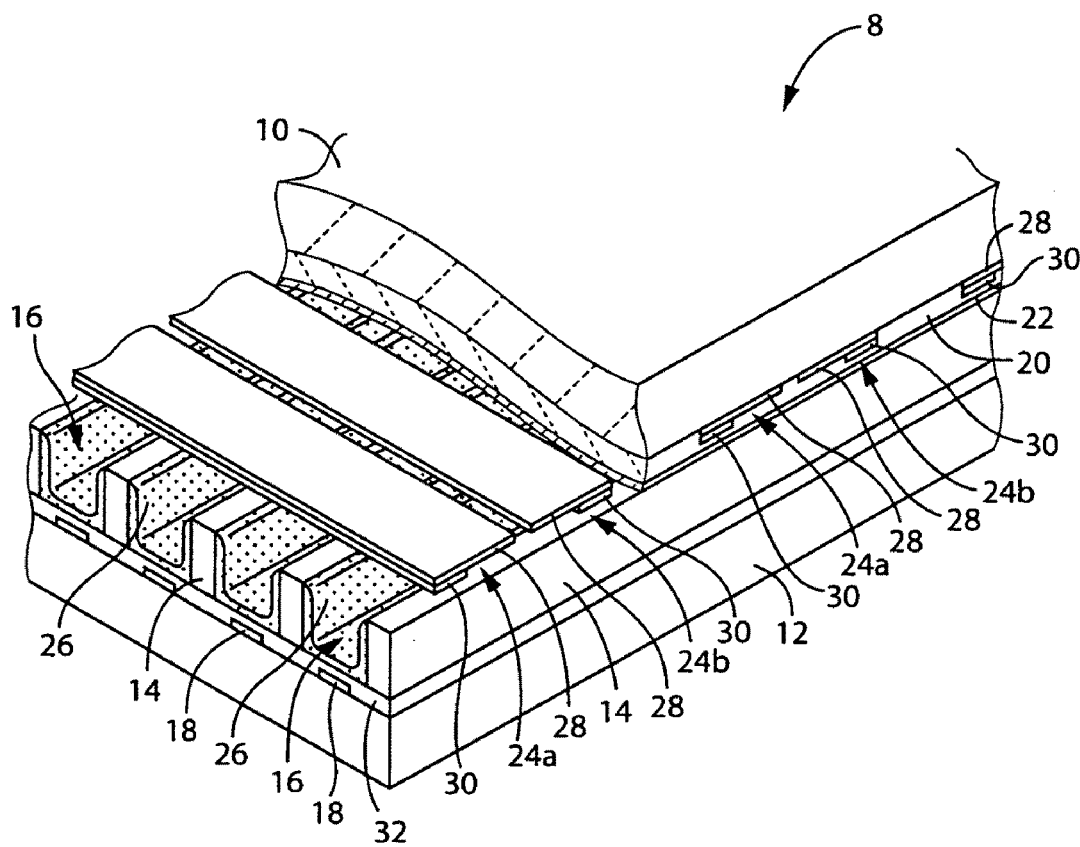
FIG. 2 illustrates a principal of a plasma display panel having a back plate with a rib substrate, partly cut off in a perspective view, in an embodiment of the present invention.

FIG. 2 illustrates a principal of a plasma display panel (PDP) 8 partly cut off in a perspective view. The PDP 8 comprises a back plate or a first substrate 12 and partition walls or rib walls 14, formed thereon according to a manufacturing method for a rib substrate of the present invention. The PDP 8 is a kind of AC type surface discharge PDP and an airtight space defined by a front plate or a second substrate 10 and the back plate 12 disposed parallel to each other comprises a plurality of discharge spaces 16 defined by the partition walls 14 that extend in one direction in the PDP 8.

The above front plate 10 and back plate 12 are made of such as transparent glass substrates such as soda lime glass, for instance, PD200 of Asahi Glass Co., Ltd., that is translucent and has a softening point of about 700° C. The above partition walls 14 are made of, for instance, lead-free glass of such as $SiO_2$—$B_2O_3$—$ZnO$—$Al_2O_3$—$CaO$—$SrO$—$Li_2O$—$K_2O$ series, $ZnO$—$B_2O_3$—$SiO_2$ series, $ZnO$—$B_2O_3$—$SiO_2$—$Al_2O_3$ series or $ZnO$—$B_2O_3$—$SiO_2$—$Al_2O_3$—$Li_2O$—$Na_2O$ series, or thick layer material mainly having $Bi_2O_3$—$SiO_2$ series glass and Bi series glass such as $Bi_2O_3$—$B_2O_3$—$SiO_2$ series glass, and have a width of about 60 μm-1.0 mm, for instance, about 200 μm and a height of 5-300 μm, for instance, about 20 μm. Each of a plurality of the partition walls 14 is disposed with an interval of about 0.2-3 mm, for instance, about 1.0 mm at its center from the center of the adjacent partition wall. Appropriate addition of such as inorganic filler or inorganic pigment, for instance, such as powder of titania, alumina or zirconia, causes white partition walls in color and regulated ones in such as denseness, strength and shape retention of the layer (partition wall). The partition wall 14 corresponds to the rib wall in this embodiment.

A plurality of address electrodes 18 are disposed on the back plate 12 between the partition walls 14, and covered with a white dielectric layer 32. The partition walls 14 are projectingly disposed on the white dielectric layer 32.

The white dielectric layer 32 has a thickness of, for instance, 10-20 μm, and is made of material for the thick layer, mainly having $SiO_2$—$B_2O_3$—$ZnO$—$Al_2O_3$—$ZrO_2$—$RO$—$R_2O$ series glass, or this glass with addition of such as $TiO_2$, $MoO_3$, $Bi_2O_3$, $CaF_2$, $Sb_2O_3$, $V_2O_5$ and/or $P_2O_5$ having approximately equal thermal expansion coefficient and dielectric constant to those of the partition wall 14. Addition of the inorganic pigment causes the white dielectric layer 32 to be white in color like the partition wall 14. A rib substrate is constituted of the back plate 12, the address electrodes 18 and the white dielectric layer 32 on the back plate 12, and the partition walls 14 projected from the surface of the white dielectric layer 32 in the present embodiment.

A plurality of pairs of display discharge electrodes (retaining electrodes or discharge retaining electrodes) 24a, 24b are disposed on the front plate 10, and the electrodes 24a, 24b are covered with a dielectric layer 20 made of low softening point glass of such as borosilicate glass and protection layer 22 made from such as magnesium oxide (MgO), extending in a direction at a right angle to the longitudinal direction of the partition wall 14. Each of a plurality of the discharge spaces 16 is divided into a plurality of luminous division corresponding to each pair of the display discharge electrodes 24a, 24b. Fluorescent layers 26 are disposed on the inner surface of the back plate 12 and the surfaces of the partition walls 14 in each of the discharge space 16.

Each of the display discharge electrodes 24a, 24b are constituted of a transparent electrode 28, or a transparent conductive layer, and a bus electrode 30. The transparent electrode 28 is made from such as indium tin oxide (ITO) or antimon tin oxide (ATO) formed in such as a thin film process. The bus electrodes 30 are formed on the transparent electrodes 28 at the laterally outer ends of each pair of the electrodes 28. These cause to generate the surface discharge in a vast region and to possibly reduce light shielding of the display light emitted through the front plate 10.

Thus-constructed PDP 8 displays a picture by selecting desired luminous divisions to be luminous from a plurality of the luminous divisions by generating address discharge between the address electrode 18 and the display discharge electrode 24a in each frame of displaying pictures, and by generating display discharge between the display discharge electrodes 24a and 24b in the selected luminous division and maintaining the discharge (that is, repeating to generate discharges) during the duration of a frame. Repetition of the selection of divisions and maintenance of discharge cause successive displaying of desired picture images. Details of the drive method are not explained here because it is not requisite for understanding of the present embodiment.

The partition wall 14 is formed on the back plate 12 in, for instance, a chemical etching method. Formation of the partition wall 14, that is, the manufacturing method of the rib substrate, is disclosed below by reference to FIG. 3 showing the essential steps in manufacturing and FIG. 4 illustrating diagrams for the steps.

In an address electrode forming step P1, the address electrode 18 is formed by cleaning the surface of the back plate 12, then, printing a predetermined band pattern with thick layer silver paste on the back plate 12, for instance, in a thick film screen printing method, and drying and burning. The burning temperature, for instance, is determined at a temperature about 10-30° C. higher than the softening point of the comprised glass as well as in each requirement for burning described below. In a white dielectric layer forming step P2, the white dielectric layer 32 is formed by applying glass paste onto the address electrode 18 as covering the whole upper surface of the back plate 12, for instance, in a thick film screen printing method, and drying and burning.

The glass paste for forming the white dielectric layer 32 is prepared such that $SiO_2$—$B_2O_3$—$ZnO$—$Al_2O_3$—$Bi_2O_3$—$BaO$ series glass powder, or glass powder of $SiO_2$—$B_2O_3$—$ZnO$—$Al_2O_3$—$Bi_2O_3$—$BaO$ series glass powder with such as $Li_2O$, $Na_2O$, $ZrO_2$, $TiO_2$, $MoO_3$, $CuO$, $P_2O_5$ and/or $SnO_2$ added, is dispersed in vehicle with inorganic filler. The white dielectric layer 32 is made of, for instance, glass comprising 5-25% of $SiO_2$, 4-30% of $B_2O_3$, 7-30% of ZnO, 15-70% of $Bi_2O_3$, 0-15% of $Al_2O_3$, 5-20% of BaO. Any cavities or cavity layers 62 are not formed around the interface of the white dielectric layer 32 and the back plate 12, and also adjacent to the address electrode 18 by grace of construction of the white dielectric layer 32 made of the $Bi_2O_3$ series glass mentioned above and not less than 5% of BaO included. That is, the white dielectric layer 32 is preferably close contact with the back plate 12.

The above glass powder is manufactured by preparing, for instance, silicon dioxide for $SiO_2$, boric acid for $B_2O_3$, zinc oxide for ZnO, aluminum oxide for $Al_2O_3$, bismuth oxide for $Bi_2O_3$ and barium carbonate for BaO, mixing each amount of them in a predetermined weight ratio for the desired composition, heating them in a melting pot at about 1200-1400° C. for about thirty minutes to an hour to melt them for synthesizing of glass, and milling the glass to provide the glass powder having an appropriate size by a suitable milling machine such as a pot mill. The average diameter of the milled glass (powder) is, for instance, about 1.5 μm. The vehicle, for instance, in which resin component (organic bond) such as ethylcellulose or acrylic is dispersed in organic solvent such as terpineol or buthyl carbitol acetate is preferably employed. Each paste below is also manufactured in the same manner. Other materials such as lithium carbonate for $Li_2O$, sodium carbonate for $Na_2O$, zirconium oxide for $ZrO_2$ and titanium dioxide for $TiO_2$ may be employed.

In a rib material forming step P3 a rib material layer 36 that extends and cover the whole upper surface of the white dielectric layer 32 with an even thickness equal to that of the partition wall 14, is formed by applying the glass paste onto the whole upper surface of the white dielectric layer 32, for instance, in the thick film screen printing, and drying and burning. FIG. 4A illustrates these layers in the step P3. Glass paste in which $SiO_2$—$B_2O_3$—$ZnO$—$Al_2O_3$—$CaO$—$SrO$—$Li_2O$—$K_2O$ series glass powder is dispersed in the vehicle with inorganic pigment is employed for the glass paste for forming the rib material layer 36.

In an etching step P4 a resist layer 38 having an opening pattern (or resist pattern) and shielding portions for the partition wall 14 to be formed and open over the other portions, is formed on the rib material layer 36 by an appropriate optical manner, and is treated in the chemical etching treatment with acid. FIG. 4B illustrates the layers having the resist pattern thereon and FIG. 4C illustrates the layers after the chemical etching treatment. Many kinds of acid, for example, nitric acid, hydrochloric acid or hydrofluoric acid, can be used in the etching step P4. Nitric acid or the mixture of nitric acid and hydrochloric acid is preferably used. The compositions of the white dielectric layer 32 and rib material layer 36 are determined such that the etching rate of the white dielectric layer 32 is about 1/10-1/3 of that of the rib material layer 36. Accordingly, the white dielectric layer 32 is maintained approximately without dissolved, even with the open portions of the rib material layer 36 perfectly removed by dissolving the portions under the open pattern of the resist layer 38, through regulation in acid concentration and treatment time of the etching treatment. As a result, this provides the partition wall 14 formed with the expected dimensions and shape in accordance with the open pattern of the resist layer 38. Thus, the rib substrate having the partition wall 14 on the back plate 12 is provided after forming of the partition wall 14 and then physical and chemical removal of the resist layer 38.

The compositions and characteristics of thirteen sorts of glasses of embodiments according to the present invention and five sorts of glasses of comparative examples are shown in the following Table 1. Embodiments 1-13 (hereinafter, referred to as E1-E13) are variations of the composition of the white dielectric layer 32 in weight ratios of their components. Comparative Example 1 (hereinafter, referred to as C1) is the glass for the white dielectric layer of the PDP 8 of which the partition wall 14 is formed in the sandblast method. Comparative Examples 2-4 (C2-C4) are similar bismuth (Bi) series glasses to such as E1 and have improper weight ratios of the constructed materials. Comparative Example 5 (C5) is $SiO_2$—$B_2O_3$—$ZnO$ series glass without $Bi_2O_3$. Every evaluation or test for these embodiments and comparative examples is performed according to the above manufacturing steps, under common conditions including requirements in manufacturing and materials to be used, other than variations of the white dielectric layer 32.

TABLE 1

| (Weight %) | C1 | C2 | C3 | C4 | C5 | E1 | E2 |
|---|---|---|---|---|---|---|---|
| $SiO_2$ | 10.61 | 6.00 | 12.00 | 11.40 | 20.00 | 11.50 | 11.40 |
| $B_2O_3$ | 35.35 | 24.00 | 8.00 | 7.60 | 28.00 | 7.70 | 7.60 |
| ZnO | 20.32 | 20.00 | 10.00 | 9.60 | 30.00 | 9.80 | 9.60 |
| $Al_2O_3$ | 3.81 | 3.00 | 2.00 | 2.00 | 6.00 | 2.00 | 2.00 |
| $Bi_2O_3$ | — | 42.00 | 65.00 | 62.40 | — | 64.00 | 62.40 |
| BaO | 18.96 | 3.00 | 3.00 | — | — | 5.00 | 7.00 |
| SrO | — | — | — | 7.00 | 5.00 | — | — |
| $Li_2O$ | 3.09 | 2.00 | — | — | 6.00 | — | — |
| $Na_2O$ | 7.86 | — | — | — | 6.00 | — | — |
| $ZrO_2$ | — | — | — | — | — | — | — |
| $TiO_2$ | — | — | — | — | — | — | — |
| SP | 535.0 | 513.3 | 547.9 | 558.5 | 560.0 | 550.3 | 552.2 |
| TEC | 8.0 | 7.0 | 7.6 | 7.8 | 7.5 | 7.8 | 8.0 |
| SVR | 10 | 1.0 | 0.4 | 0.4 | 50.0 | 0.4 | 0.4 |
| DC | 12 | 19 | 19 | 19 | 17 | 19 | 19 |

| (Weight %) | E3 | E4 | E5 | E6 | E7 | E8 | E9 |
|---|---|---|---|---|---|---|---|
| $SiO_2$ | 13.50 | 6.00 | 9.00 | 15.70 | 13.50 | 14.00 | 19.17 |
| $B_2O_3$ | 13.60 | 17.00 | 17.00 | 5.00 | 8.50 | 8.00 | 17.04 |
| ZnO | 13.80 | 16.00 | 11.00 | 8.30 | 8.00 | 8.00 | 24.57 |
| $Al_2O_3$ | 1.60 | 2.00 | — | 3.00 | 3.50 | 3.00 | 5.80 |
| $Bi_2O_3$ | 49.20 | 52.00 | 35.00 | 62.00 | 57.00 | 57.25 | 16.92 |
| BaO | 8.40 | 5.00 | 17.00 | 5.00 | 7.00 | 7.00 | 11.23 |
| SrO | — | — | — | — | — | — | — |
| $Li_2O$ | — | — | 5.00 | 0.50 | 0.30 | 0.40 | 2.04 |
| $Na_2O$ | — | — | — | 0.40 | 0.40 | 0.85 | 3.22 |
| $ZrO_2$ | — | 1.00 | 3.00 | 0.40 | 1.50 | 1.50 | — |
| $TiO_2$ | — | 1.00 | 3.00 | — | — | — | — |
| SP | 576.0 | 545.1 | 497.2 | 545.2 | 540.3 | 535.2 | 557.0 |
| TEC | 7.5 | 7.5 | 10.4 | 8.2 | 8.0 | 8.2 | 7.3 |
| SVR | 1.3 | 0.5 | 1.0 | 0.4 | 0.4 | 0.4 | 2.0 |
| DC | 19 | 19 | 18 | 17 | 20 | 19 | 14 |

| (Weight %) | E10 | E11 | E12 | E13 |
|---|---|---|---|---|
| $SiO_2$ | 15.70 | 8.00 | 13.00 | 13.10 |
| $B_2O_3$ | 10.50 | 21.00 | 9.50 | 7.80 |
| ZnO | 14.50 | 15.00 | 25.00 | 10.70 |
| $Al_2O_3$ | 2.00 | 3.00 | 3.00 | 2.00 |
| $Bi_2O_3$ | 49.90 | 35.00 | 30.00 | 58.30 |
| BaO | 5.90 | 13.00 | 10.00 | 8.10 |
| SrO | — | — | — | — |
| $Li_2O$ | 0.50 | 2.00 | 2.00 | — |
| $Na_2O$ | 1.00 | — | 1.00 | — |
| $ZrO_2$ | — | 1.50 | 2.00 | — |
| $TiO_2$ | — | 1.50 | — | — |
| SP | 550.5 | 518.5 | 550.1 | 555.5 |
| TEC | 7.7 | 7.4 | 7.5 | 8.2 |
| SVR | 0.5 | 1.5 | 2.0 | 0.6 |
| DC | 18 | 18 | 18 | 19 |

Notes:
C1-C5: Comparative Examples 1-5
E1-E5: Embodiments1-13
SP: Softening Point (° C.)
TEC: Thermal Expansion Coefficient ($\times 10^{-6}$/° C.)
SVR: Solution Velocity Ratio (Value of E2 as a reference of 1.0)
DC: Dielectric Constant The softening point in Table 1 was measured by the operational differential thermobalance by the increasing a temperature of 10° C./min with glass powder of about 1.5 μm in average grain diameter made by milling, after heated and dissolved in the above manufacturing steps. The thermal expansion coefficient was measured by the differential thermal dilatometer by the increasing a temperature of 10° C./min with the cylinder of φ5 mm (5 mm in diameter)×20 mm in length made of the above glass powder formed by pressing, after burnt at the temperature 10° C. higher than the softening point. The acid resistance was evaluated by measurement of reduction in weight in the immersion test. For the immersion test, glass paste was prepared by adding organic solvent and vehicle into the above glass powder, the glass paste was printed on the slide glass, and the slide glass was burnt. In the immersion test, then, the burnt slide glass was immersed in nitric acid of 2% concentration heated at 40° C. for three minutes. In Table 1 the acid resistance is indicated by values of Solution Velocity Ratio (SVR) in which the value of C2 is regarded as a reference of 1.0 because although the composition of C2 causes cavities (or cavity layers) between the dielectric layer and the glass substrate, C2 is sufficiently acid-resistant. It is appropriate if the solution velocity ratio is not more than twice value (=2.0) of C2.

The softening point, thermal expansion coefficient and dielectric constant of all the comparative examples and embodiments meet requirements for the PDP. All the softening points are below 600° C., all the thermal expansion coefficients are approximately in the range of $7.0-10.0 \times 10^{-6}/°$ C., and all the dielectric constants are not more than 20. Although the thermal expansion coefficient of E5 is $10.4 \times 10^{-6}/°$ C. and slightly out of the above appropriate range, the difference in the coefficients can be regarded as the tolerance and the coefficient of E5 is also regarded as appropriate.

The solution velocity ratio of C1 is 10 and that of C5 is 50 and they are remarkably higher than that of C2, the reference. Accordingly, C1 and C5 should be judged as insufficient in acid resistance and the compositions of C1 and C5 are inappropriate and should not be used for forming the partition wall 14 by etching. It is inferred that C1 is low in acid resistance because it includes excessive $B_2O_3$ without $Bi_2O_3$. And it is inferred that C5 is low in acid resistance due to no existence of $Bi_2O_3$. The other comparative examples and embodiments have low values for the solution velocity ratio and sufficient acid resistance. Although the solution velocity ratios of E3 (1.3), E9 (2.0), E11 (1.5) and E12 (2.0) are inferior to that of such as E1 (0.4) and E1 is relatively preferable, the difference in that ratios can be regarded as the tolerance and the ratio of E3, E9, E11 and E12 is also regarded as appropriate.

Cavities or cavity layers at the interface of the white dielectric layer and glass substrate were sought in each composition of glass by a microscope. The silver (Ag) electrode is printed in the line pattern on the high distortion point glass substrate, the substrate is burnt, then, each glass paste using each glass of the embodiments and comparative examples is printed on the substrate, and the substrate is burnt to form the white dielectric layer. Cavities were found at the interfaces of C2-C5, and no cavities or almost no cavities were found at the interfaces of C1 and E1-E13. Cavities in the whole panel were sought after the PDP 8 was manufactured by forming partition walls 14 and others and integrated with the front plate 10. The light emitting cell was regarded as the cell having no cavities, and the cell emitting no light was regarded as the cell having cavities in the powered condition. The result that C2-C5 respectively had many cells emitting no light and E1-E13 had almost no cells emitting no light, of this corresponded with that by the microscope.

Figure 5:
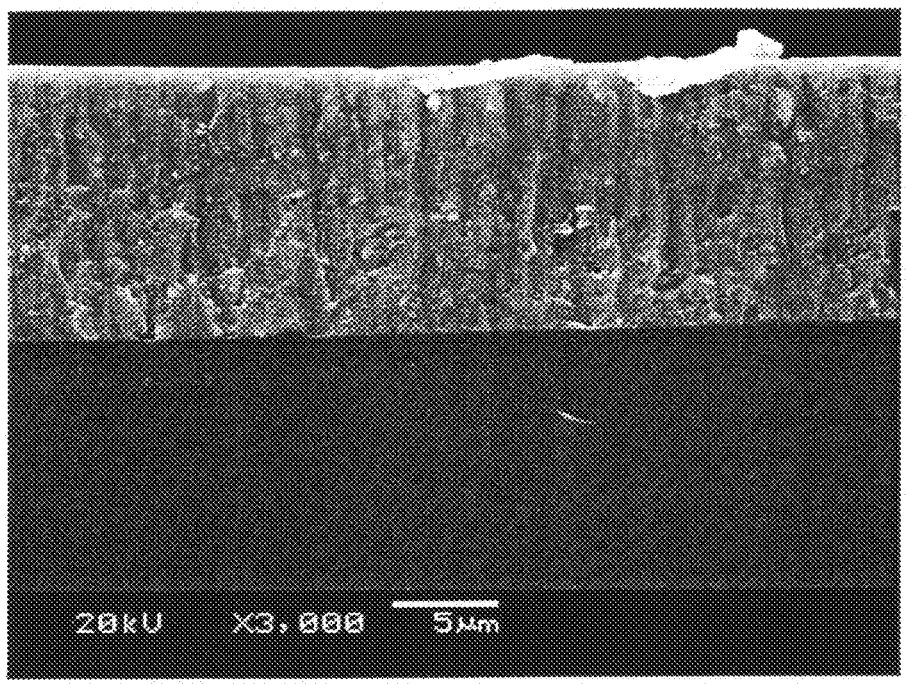
FIG. 5 illustrates the interface between the substrate and the white dielectric layer in Embodiment 2 and prepared based on a micrograph.
Figure 6:
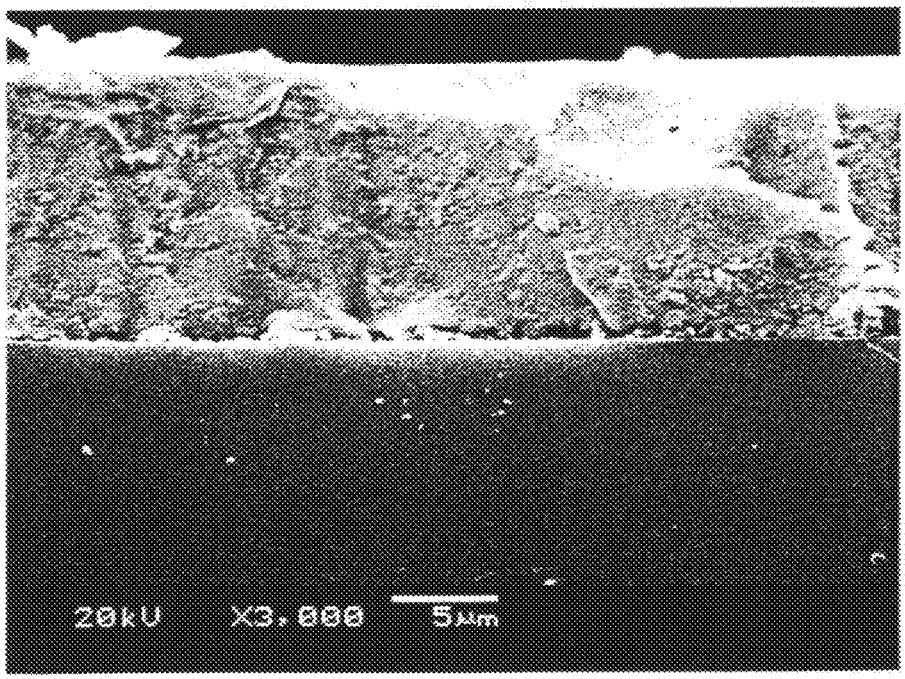
FIG. 6 illustrates the interface between the substrate and the white dielectric layer in Comparative Example 3 and prepared based on a micrograph.
Figure 7:
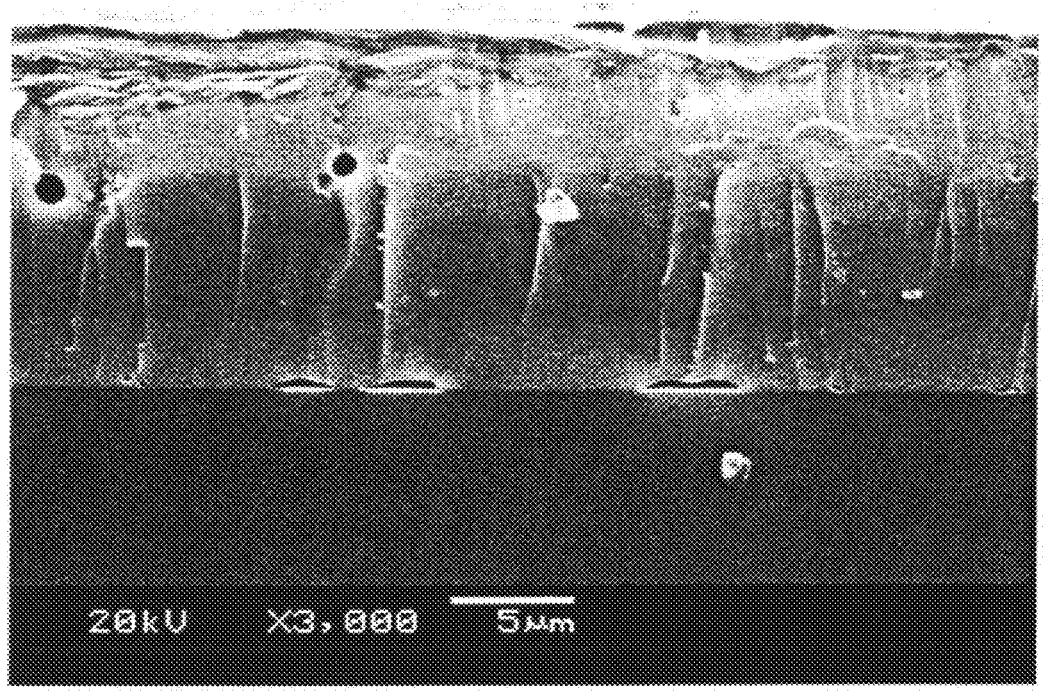
FIG. 7 illustrates the interface between the substrate and the white dielectric layer in Comparative Example 4 and prepared based on a micrograph.

FIGS. 5-7 illustrate examples of the interfaces prepared based on the micrographs, and each illustrates the interface between the substrate and the white dielectric layer made of the glass, respectively, according to Embodiment 2 (E2), Comparative Example 3 (C3) or Comparative Example 4 (C4). In FIGS. 5-7 the white dielectric layer is in the upper part, the glass substrate is in the lower part, and the interface between the white dielectric layer and the glass substrate is in the middle part. In FIG. 5 no cavities are substantially found adjacent to the interface where the white dielectric layer is made of the glass according to Embodiment 2. In FIGS. 6 and 7 cavities are found, although they vary in numbers and sizes in line with the composition of the glass, adjacent to the interface where the white dielectric layer is made of the glass according to Comparative Examples 3 and 4, respectively, and accordingly, cause changes in electric characteristics.

Comparative Examples 2 and 3 having the above cavities formed include only 3.00% of BaO, and Comparative Examples 4 and 5 include no BaO. On the other hand, Comparative Example 1 and Embodiments 11-13 having no cavities formed include BaO in the range of 5.0-17.0%, that is, they has the composition including not less than 5% of BaO. Consequently, the white dielectric layer is inferred to require the composition including not less than 5% of BaO to avoid cavities. Comparative Examples 4 and 5 having respectively 7% or 5% of SrO, other alkali earth metal, instead of BaO cannot avoid cavities. Comparative Example 4 has the same composition as Embodiment 2 other than including SrO instead of BaO included in Embodiment 2. Accordingly, it is inferred that the white dielectric layer requires the composition including not less than 5% of BaO to avoid cavities and other alkali earth metal instead of BaO is not available for avoiding cavities.

Although figures illustrating the interfaces prepared based on the micrographs are not provided in the present application, some PDPs having cavities formed to a degree were found in PDPs of which the white dielectric layer has 5% of BaO of Embodiments 1, 4 and 6, or 5.9% of BaO of Embodiment 10. On the other hand, no PDPs having cavities formed were found in PDPs of which the white dielectric layer has not less than 7% of BaO of Embodiments 2, 3, 5, 7-9 and 11-13. As a result, it is inferred that the white dielectric layer having not less than 5% of BaO are effective to avoid cavities, and the white dielectric layer having not less than 7% of BaO can avoid cavities.

Although BaO is an available component to avoid cavities as described above, the thermal expansion coefficient tends to become larger as the content of BaO becomes larger. For instance, the thermal expansion coefficient $10.4 \times 10^{-6}/°$ C. having 17% of BaO in Embodiments 5 is within the tolerance but large. Since it is appropriate that the thermal expansion coefficient of the white dielectric layer is adjacent to that of the glass substrate, it is inferred that the content of BaO should be about 17% at the maximum.

It is to be understood that the present invention may be embodied with other changes, improvements, and modifications that may occur to a person skilled in the art without departing from the scope and spirit of the invention defined in the appended claims.

What is clamed is:

1. Lead-free acid-resistant glass composition comprising 5-25% of $SiO_2$, 4-30% of $B_2O_3$, 7-30% of ZnO, 15-70% of $Bi_2O_3$, 0-15% of $Al_2O_3$, 5-20% of BaO, 0.4-1.5% of $ZrO_2$ in weight percentage, and being substantially lead-free.

2. The composition according to claim 1, including not less than 7% of BaO in weight percentage.

3. Glass paste comprising the composition according to claim 1, inorganic filler, vehicle, and having a dielectric constant after burnt of not more than 20.

4. Glass paste comprising the composition according to claim 2, inorganic filler, vehicle, and having a dielectric constant after burnt of not more than 20.

5. A plasma display panel comprising a first substrate and a second substrate opposed to each other, an address electrode disposed on the first substrate, a white dielectric layer covering the address electrode, a discharge retaining electrode disposed on the second substrate, a dielectric layer covering the discharge retaining electrode, a protection layer disposed on the dielectric layer, a partition wall disposed between the first and second substrates so as to divide a space between the first and second substrates into a plurality of discharge cells, fluorescent layers formed in the discharge cells for respectively emitting red, green and blue lights;

the white dielectric layer being made of lead-free acid-resistant glass composition including 5-25% of $SiO_2$, 4-30% of $B_2O_3$, 7-30% of ZnO, 15-70% of $Bi_2O_3$, 0-15% of $Al_2O_3$, 5-20% of BaO, 0.4-1.5% of $ZrO_2$ in weight percentage, and being substantially lead-free.

6. The composition according to claim 1, wherein more than 10% and not more than 25% of $SiO_2$ is contained, and more than 0% and not more than 15% of $Al_2O_3$ is contained.

* * * * *